3,189,406
PROCESS FOR THE REMOVAL OF ORGANIC
SULPHUR COMPOUNDS FROM GASES
Klaus Storp, Frankfurt am Main, and Heinrich Kleemann, Walldorf, Hesse, Germany, assignors to Laboratorium fuer Adsorptionsteichnik G.m.b.H., Frankfurt am Main, Germany
No Drawing. Filed May 29, 1962, Ser. No. 198,443
Claims priority, application Germany, Aug. 6, 1959, L 33,904
4 Claims. (Cl. 23—2)

This is a continuation-in-part of our application Serial Number 41,825, filed July 11, 1960, now U.S. Patent No. 3,116,970, issued January 7, 1964.

The invention relates to the removal of sulfur compounds from gases and, more particularly, to such a process using low operating temperatures. The process is equally applicable to the removal of organic and inorganic sulfur compounds.

The oxidation of hydrogen sulfide to elemental sulfur over activated carbon and the separation of the sulfur thus obtained by adsorption on said carbon is known. This process preferably takes place at temperatures of 100 to 120° C. It also is known that organic sulfur compounds may be split hydrolytically to hydrogen sulfide over catalysts in the presence of steam, whereby as catalyst usually activated alumina is used to which thorium oxide or cerium oxide had been added in varying amounts. Therefore, it would seem obvious, for the purpose of removing organic sulfur compounds from gases, to split these compounds catalytically over thorium or cerium oxide and to separate the hydrogen sulfide thus formed by a treatment with activated carbon. However, such a method is highly uneconomical since the hydrolysis reaction according to the equation $$CS_2 + H_2O \rightarrow CO_2 + 2H_2S$$

depends to a great extent upon the temperature. A 100 percent conversion does not occur until temperatures of 300 to 700° C. have been reached. At temperatures of, e.g., 120 to 140° C., which industrially can be attained by comparatively simple means, merely 20 to 30 percent of the sulfur compounds can be split. The hydrolysis of the organic sulfur compounds, consequently, is coupled with high costs for heating the gases which, after hydrolysis, must be cooled down to the temperatures required for the treatment with activated carbon.

According to one of the objects of the invention, the hydrolysis of organic sulfur compounds succeeds at temperatures which obviate the need for subsequent cooling of the gases in order to effect the ensuing treatment with activated carbon. Furthermore, the invention has as one of its principal objects to carry out the reaction by conducting the gases, for the purpose of splitting and separating the organic sulfur compounds, alternately and consecutively over layers consisting of activated aluminum oxide, such as γ-aluminum oxide, china clay, or the like, and over layers consisting of activated carbon or other sulfur-binding material, at a temperature below 150° C. and, preferably, at 110–120° C.

It is another very important object of the invention to carry out the reaction while using a catalyst solely aluminum oxides, as named above, and to dispense with the addition of cerium oxide, thorium oxide or any other substance as catalyst or co-catalyst. Hitherto, alumina had been considered primarily a carrier for such catalysts as thorium or cerium oxide with very little, if any, catalytic action of its own.

When operating according to the invention, the hydrogen sulfide formed in the catalytically acting aluminum oxide layers is oxidized to elemental sulfur on a layer of activated carbon, following the aluminum oxide layer, and is precipitated thereon. It is the salient feature of the invention that the equilibrium of the reaction continuously is upset by continuous separation of the hydrogen sulfide formed thus obtaining, as end effect, a complete reaction and separation of the organic and/or inorganic products in the gases through the continuous change.

In carrying out the reaction, it, of course, is required to work while maintaining the conditions customary for catalytic splitting and for the treatment with activated carbon, i.e., for the hydrolysis a sufficient quantity of water must be present and, for the oxidation of the hydrogen sulfide, the stoichiometrically required amounts of oxygen must be provided.

The activated alumina (aluminum oxide) and the activated carbon advantageously are disposed in layers on perforated trays. The trays may be inserted in a cylindrical container having such an angle of inclination that the treating agents, entered on one side of the container, can be removed simply by gravity, i.e., by allowing them to slide down on the tray. The height or thickness of the layers is dependent upon the individual conditions and is determined for each individual case. As a rule, layer thicknesses of 10 to 15 cm. suffice. However, the height of the layer can be varied to be below those figures or to exceed them. The number alternating alumina and carbon layers depends upon the permissible residual sulfur content of the gases and may be 10, 15, 20 or more.

Inasmuch as the activated carbon not only serves the purpose of accelerating the oxidation of $H_2S$ and of binding the elemental sulfur thus formed, but also is to forestall a sublimation of the elemental sulfur in the next following catalyst layer, the employment of a highly activated grainy carbon of comparatively dense structure is recommended. Such an activated carbon is capable of adsorbing up to 80 percent of its weight of elemental sulfur. This feature imparts to the process according to the invention considerable advantages over conventional processes, wherein the activated carbon at comparably low temperatures accepts merely 0.1 to 1 percent sulfur and hence requires regeneration after a very short period of time.

Another advantage of the process according to the invention resides in the effect whereby a simultaneous separation of organic and inorganic sulfur occurs. Consequently all technical gases can be desulfurized according to the invention, such as hydrogen, nitrogen, water gas, natural gas, carbon monoxide, carbon dioxide, and others. The requirements as to purity of the gases to be desulfurized are slight, e.g., the limit of the amount of resin formers which may be present, since the first carbon layer acts as a pre-filter so that only largely purified gases meet the succeeding catalyst layers.

The separation of resin formers and the like opportunely is carried out at low temperatures, substantially at room temperature, e.g., at 20° C., when the resin formers are present in the gases as volatile compounds, e.g., dissolved in the benzene homologs which also are present. If the temperature in the first catalyst layer acting as a pre-filter is too high, the resin formers travel through that layer without being precipitated in the form of resins. Consequently, resins also are separated in the succeeding layers of activated alumina and activated carbon, so that these layers lose their effectiveness prematurely. For the first carbon layer which acts as a pre-filter, it therefore is indicated to employ a special carbon which has as many fine pores as possible. This effects a lowering of the vapor pressure of the resin formers so that their removal becomes substantially complete.

The regeneration of the first layer of activated carbon is accomplished in the conventional manner by steaming after the breakthrough of the resin formers. When coke oven gas is treated, the adsorbability of the first carbon layer up to such a breakthrough has been established as 10–20 m.³ per kilogram carbon.

Another measure of advantage in the purification of gases containing resin formers consists in apportioning the quantity of oxygen for the reaction of the hydrogen sulfide formed in the hydrolysis high enough that the oxygen present suffices to oxidize and separate resin formers in the succeeding activated carbon layers.

Especially when working with comparatively thin carbon layers, it is possible that, e.g., $CS_2$, reacted to $H_2S$ in the catalyst layer, is not completely oxidized to S in the succeeding carbon layers and is adsorbed. In order to avoid this, a sufficiently thick (or high) layer of activated carbon is put behind the alternating layers of alumina and carbon—with an activated carbon layer constituting the last layer—which is held at the same temperature as the preceding alternating layers but in which is entered such an amount of oxygen that residual sulfur compounds present in the gases are sure to be oxidized and then adsorbed. This last activated carbon layer may be disposed in the same space as the outer layers or else may be housed in a separate adsorber. In lieu of this last activated carbon layer for the removal of residual hydrogen sulfide, sulfur-binding compounds, e.g., Lux-mass, may be employed.

If the treatment of the gases to be desulfurized permits it, the desulfurization advantageously is carried out under pressure.

The invention now will be further explained by the following examples. However, it should be understood that these are given merely by way of illustration, not of limitation, and that numerous changes may be made in the details without departing from the spirit and the scope of the invention as hereinafter claimed.

In all examples, the required amounts of water and stoichiometrically sufficient quantities to oxidize hydrogen sulfide and, where applicable, also the resin formers, were employed.

Example 1

A cylindrical container was loaded with 30 layers each of a high-grade activated grainy carbon (Supersorbon, registered trade mark) and activated grainy aluminum oxide (china clay or γ-aluminum oxide). The layers alternated. Into the container thus equipped, carbon dioxide gas was introduced which contained 100 mg. $CS_2$ per m.³ $CO_2$. The operating temperature was 115°.

After the gas had traversed 20 layers of alumina and 20 layers of activated carbon, 95 percent of the $CS_2$ present in the gas had been removed therefrom by reaction and under separation of elemental sulfur. After the $CO_2$ had been conducted through the remaining 10 layers each, the gas emerging from the container contained only approximately 0.5 mg. $CS_2/m.^3$.

The space velocity of this gas could be increased from 100 to 360 without incurring a measurable decrease in the effectiveness of the layers.

At an alumina-carbon volume of 5 m.³, corresponding to approximately 1 ton activated carbon and 3 tons alumina, approximately 8,000,000 m.³ $CO_2$ gas can be purified according to this example, before the sulfur adsorption on the carbon amounts to 80 percent.

Example 2

A purifying tower, equipped with superposed slanting and perforated trays, was loaded with highly activated grainy carbon black and with aluminum oxide which had been freshly precipitated, shaped in spheres and activated by calcining. The carbon and alumina were in alternating layers of 20 layers each, as described in Example 1. The volume of alumina-activated carbon was 10 m.³.

Through these alternating layers in the tower, nitrogen gas was conducted containing 50 mg. $CS_2/m.^3$. The space velocity was 100 and the treating temperature 115° C.

The gas leaving the purifying tower was of such purity and free from sulfur compound to be used for syntheses.

According to this example, 16,000,000 m.³ gas can be purified before the activated carbon has been loaded with 80 percent sulfur.

Example 3

A pressure adsorber having a capacity of 0.5 m.³ was loaded, as described in Example 2, alternately with 20 layers alumina and 20 layers activated carbon.

Through these layers nitrogen gas was conducted at an operating temperature of 115° C. and a pressure of 20 atmospheres. The nitrogen had a $CS_2$ content of 50 mg. per normal cubic meter, i.e., per cubic meter at atmospheric pressure and 20° C. The recovered gas was of a purity to be used in syntheses.

According to this example, 60,000 m.³ nitrogen gas can be desulfurized to synthesis purity at a throughput of 50 m.³/h.

Example 4

Activated aluminum oxide and activated carbon having narrow pores were disposed in 20 alternating layers each, as described in the preceding example, for the desulfurization of coke oven gas. To separate the resin formers present in the gas, a first layer of highly activated, narrow-porous carbon was provided. The operating temperature in this first layer was 20° C., in all other layers the temperature was 120° C.

Like all coke oven gas, the gas to be purified contained mercaptans, cyclic sulfur compounds and other sulfur compounds. The gas had the following composition per 100 m.³:

| | |
|---|---|
| Organic sulfur compounds _____g__ | 10 |
| Benzene _____g__ | 1,000 |
| Resin formers _____g__ | 10 |
| Oxygen _____volume percent__ | 0.3 |
| Nitric oxide _____p.p.m__ | 1 |

15 m.³ alumina and activated carbon volumes were employed at a space velocity of 100.

The gas leaving the treating space was free from sulphur and resin formers and contained merely 0.2 p.p.m. nitric oxide. Using a quantity of 3 tons activated carbon and loading the first narrow-porous layer of activated carbon with 60 percent resin formers and loading the carbon with 60 percent sulfur, more than 9,000,000 m.³ coke oven gas could be purified according to this example.

We claim as our invention:

1. A process for the removal of organic sulfur compounds selected from the group consisting of carbon disulfide and sulfur compounds as present in coke oven gases from gases, which comprises passing said gases, at temperatures of 110 to less than 150° C. and in the presence of water and oxygen in the quantities required to carry out said process, over a plurality of successively arranged alternate layers of activated alumina and activated carbon.

2. The process as defined in claim 1, wherein temperatures of 110 to 120° C. and pressures of 1 to 20 atmospheres are employed.

3. A process for the removal of organic sulfur compounds selected from the group consisting of carbon disulfide and sulfur compounds as present in coke oven gases from gases by hydrolysis, oxidation and adsorption, which comprises passing said gases, at temperatures of 110 to 120° C., at pressures of 1 to 20 atmospheres, and in the presence of water and oxygen in the quantities required to carry out said process, over a plurality of successively arranged alternate layers of activated alumina and activated carbon, said alumina acting as catalyst in said hydrolysis and oxidation, and said carbon binding the elemental sulfur formed.

4. The process as defined in claim 3, wherein said gases, prior to being passed over said alternate layers, are passed over a first layer of narrow-pored, highly activated carbon substantially at room temperature.

References Cited by the Examiner

UNITED STATES PATENTS

| | | | |
|---|---|---|---|
| 1,710,141 | 4/29 | Benner et al. | 23—3.1 |
| 2,149,039 | 2/39 | Benning et al. | 23—2.1 |
| 2,581,135 | 1/52 | Odell | 23—3.1 |
| 3,058,800 | 10/62 | Frevel et al. | 23—2.1 |
| 3,116,970 | 1/64 | Storp et al. | 23—2.1 |

FOREIGN PATENTS 341,444  1/31  Great Britain.

MAURICE A. BRINDISI, *Primary Examiner.*